United States Patent [19]
Chutorash

[11] Patent Number: 6,144,114
[45] Date of Patent: *Nov. 7, 2000

[54] AUTO PC WALLET PC FACEPLATE

[75] Inventor: Richard J. Chutorash, Rochester Hills, Mich.

[73] Assignee: Lear Automotive Dearborn, Inc.

[ * ] Notice: This patent is subject to a terminal disclaimer.

[21] Appl. No.: 09/239,850

[22] Filed: Jan. 29, 1999

Related U.S. Application Data

[63] Continuation-in-part of application No. 09/048,155, Mar. 25, 1998, Pat. No. 6,020,654.

[51] Int. Cl.$^7$ .................................................. B60R 25/04
[52] U.S. Cl. .................. 307/10.5; 340/461; 340/825.72; 345/173; 701/36; 307/10.1
[58] Field of Search ................... 307/10.1–10.6; 123/179.1–179.4; 180/287; 340/425.5, 426, 438, 825.3–825.32, 825.34, 825.44, 825.54, 825.69, 825.72; 701/1, 2, 29, 36, 49; 439/34; 345/173–178, 145, 146, 156, 157, 168, 902

[56] References Cited

U.S. PATENT DOCUMENTS

| | | | |
|---|---|---|---|
| 4,787,040 | 11/1988 | Ames et al. ................................ | 701/1 |
| 4,965,460 | 10/1990 | Tanaka et al. .......................... | 307/10.2 |
| 5,161,422 | 11/1992 | Suman et al. ........................... | 307/10.1 |
| 5,404,443 | 4/1995 | Hirata ........................................ | 701/36 |
| 5,521,443 | 5/1996 | Imura et al. ............................ | 307/10.2 |
| 5,790,965 | 8/1998 | Abe ......................................... | 307/10.1 |
| 5,808,374 | 9/1998 | Miller et al. ............................ | 307/10.1 |
| 5,889,337 | 3/1999 | Ito et al. ................................. | 307/10.1 |

*Primary Examiner*—Albert W. Paladini
*Attorney, Agent, or Firm*—Brooks & Kushman P.C.

[57] ABSTRACT

An interface communicates with a computer mounted in a vehicle. The interface includes an input device, adapted to be removed from the vehicle, having a first electrical connector. A docking site, having a second electrical connector adapted to receive the first electrical connector, is mounted in the vehicle for supporting the input device. A communication cable connects the second electrical connector to the computer thereby providing a communication path between the input device and the computer. In one embodiment, the input device includes a transmitter circuit for producing and transmitting wireless control signals. In this manner, the input device may be used to remotely control an electrical accessory device in the vehicle, such as a door lock/unlock motor. In another embodiment, the input device is used to enable the engine ignition system of the vehicle. In this manner, the vehicle may be started without an ignition key yet still be protected against theft.

18 Claims, 4 Drawing Sheets

AUTO PC WALLET PC FACEPLATE

This is a continuation-in-part of application Ser. No. 09/048155, filed Mar. 25, 1998 now U.S. Pat. No. 6,020,654 issued Feb. 1, 2000.

BACKGROUND OF THE INVENTION

This invention relates generally to an interface and, more particularly, to an interface for communicating with a computer mounted in a vehicle.

Current vehicles often include a computer mounted somewhere in the vehicle. The computer may be used to perform diagnostic analysis of various vehicle components. Typically, the computer is used to control the settings of various vehicle components such as vehicle climate control systems, the position of mirrors, seat positions, audio functions, and vehicle handling characteristics. Often, the computer is further used to control a remote keyless entry system and a vehicle security system.

In many current vehicles, the radio faceplate serves as the interface between a user and the computer. This system creates several disadvantages. A first disadvantage is that each car model generally requires a different customized radio faceplate to provide coordination with the vehicle interior. Second, current radio faceplates generally limit the ability of a user to communicate with the computer because of design and space constraints. This becomes a particular problem as designers continue to add more functions to the vehicle computer.

Thus, it is desirable to provide a standardized removable interface that can universally replace current radio faceplates. It is also desirable for the interface to control a vehicle security system and, more particularly, a vehicle ignition system. It is further desirable for the interface to remotely control one or more electrical accessory devices within a vehicle.

SUMMARY OF THE INVENTION

In general terms, this invention provides a universal interface that can be used in a wide variety of vehicles to access a vehicle computer.

In a disclosed embodiment of this invention, an interface communicates with a computer mounted in a vehicle. The interface includes an input device, adapted to be removed from the vehicle, having a first electrical connector. A docking site, having a second electrical connector adapted to receive the first electrical connector, is mounted in the vehicle for supporting the input device. A communication cable connects the second electrical connector to the computer thereby providing a communication path between the input device and the computer.

In one embodiment of the present invention, the input device includes a transmitter circuit for producing and transmitting wireless control signals. In this manner, the input device may be used to remotely control an electrical accessory device in the vehicle, such as a door lock/unlock motor. In another embodiment of the present invention, the input device is used to enable the engine ignition system of the vehicle. In this manner, the vehicle may be started without an ignition key yet still be protected against theft.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
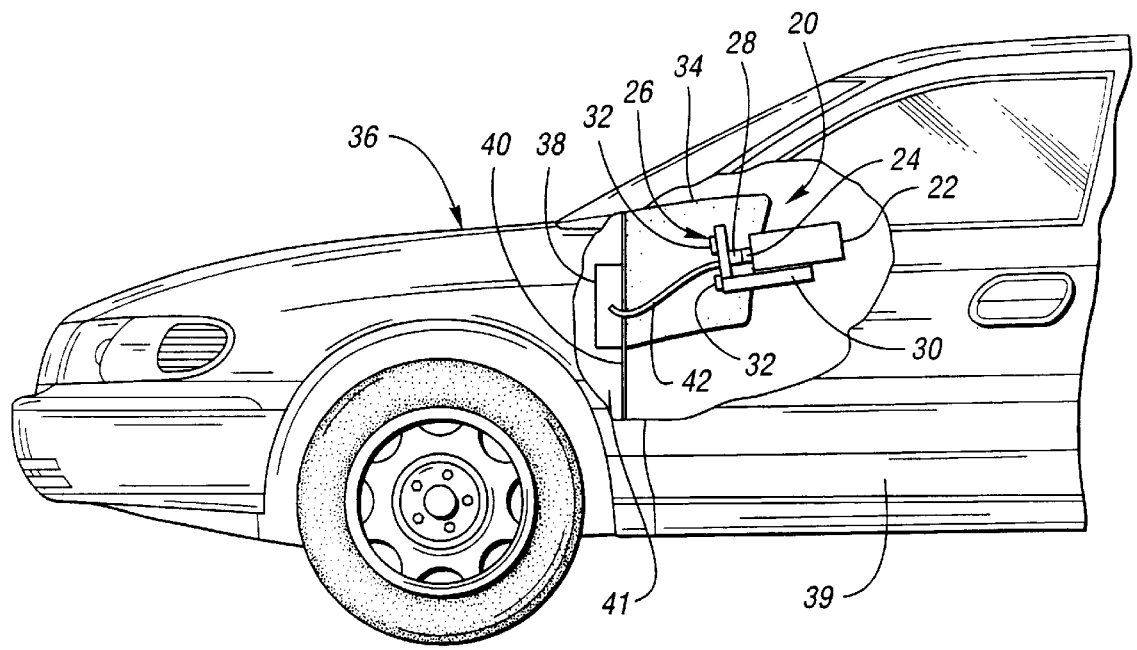
FIG. 1 is a partial cross-sectional side view of an interface designed according to the present invention mounted within a vehicle.

An interface is generally indicated at 20 in FIG. 1. The interface 20 includes an input device 22 having a first electrical connector 24. A docking site 26 includes a second electrical connector 28 that receives the first electrical connector 24. A platform 30 of the docking site 26 supports the input device 22. A plurality of fasteners 32 secure the docking site 26 within a dashboard 34 of a vehicle 36. A computer 38 is secured to a surface 40 of the vehicle 36. The surface 40 may be the firewall typically found between a passenger compartment 39 and an engine compartment 41. As will be understood by one of ordinary skill in the art, the computer 38 could also be mounted elsewhere within the vehicle 36. A communication cable 42 connects the second electrical connector 28 to the computer 38. Preferably, the first electrical connector 24, second electrical connector 28, and communication cable 42 form a high speed serial connection. As will be understood by one of ordinary skill in the art, the connection between the first electrical connector 24 and the computer 38 may be of a type other than a high speed serial connection. As shown in FIG. 1, the input device 22 and docking site 26 are located within the dashboard 34. Alternatively, the docking site 26 and the input device 22 could be mounted in another site within the vehicle 36 such as in a console or armrest (not shown).

Figures 2, 3:
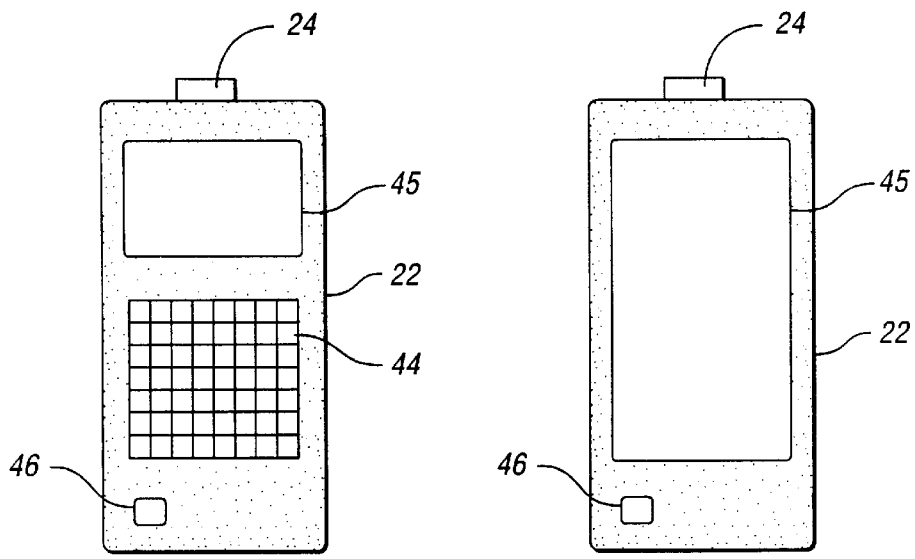
FIG. 2 is a top plan view of an input device having a keyboard designed according to this invention.
FIG. 3 is a top plan view of an input device having a touch sensitive screen designed according to this invention.

FIG. 2 is a top plan view of one embodiment of the input device 22. In this embodiment, the input device 22 includes a keyboard 44, a display 45, and a microphone 46. The keyboard 44 is utilized for communication between the input device 22 and the computer 38. The display 45 displays data sent to and received from the computer 38. The microphone 46 is optional and provides a means both for recording audible input and for controlling the computer 38 through audible input.

FIG. 3 is a top plan view of an alternative embodiment of the input device 22 having a touch sensitive screen 48. The touch sensitive screen 48 serves both as a display for displaying data sent to and received from the computer 38 and as a means for entering data to be sent to the computer 38. The touch sensitive screen 48 is of an ordinary design as will be understood by one having ordinary skill in the art.

Figure 4:
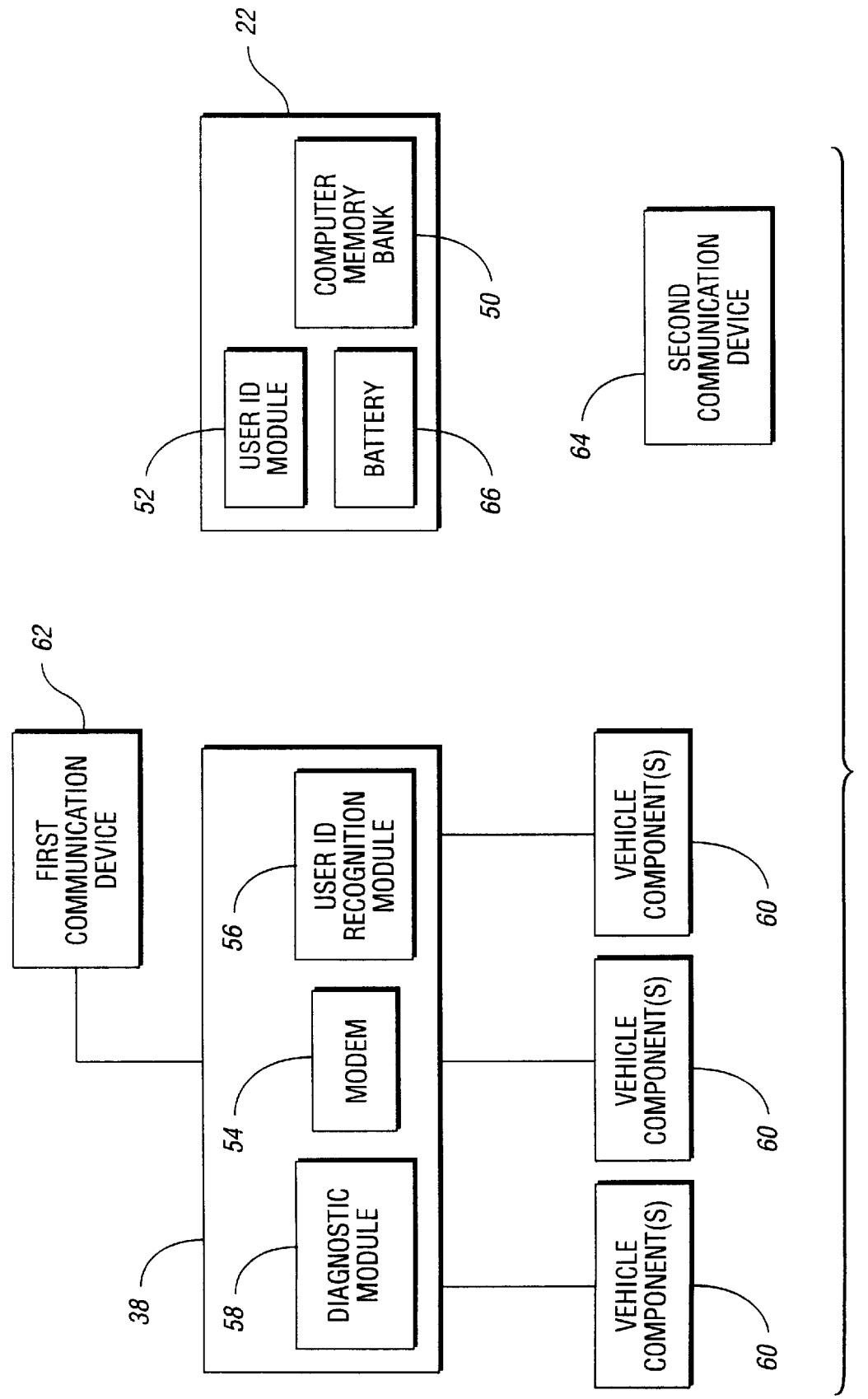
FIG. 4 is a schematic of a first embodiment of an interface designed according to this invention.

FIG. 4 is a schematic of a first embodiment of the interface 20 designed according to this invention. Preferably, the input device 22 includes a computer memory bank 50 for storing data received from the computer 38 or the input device 22. The input device 22 further includes a user identification module 52. Preferably, the user identification module 52 is implemented through software and allows a user to assign user preferences to the input device 22. Preferably, the computer 38 further includes a modem 54, a user identification recognition module 56 and a vehicle diagnostics module 58. Most preferably, both the user identification recognition module 56 and the vehicle diagnostics module 58 are implemented through software. A plurality of vehicle components 60 are connected to the computer 38 and the computer 38 controls various settings of the vehicle components 60. A first communication device 62 is also connected to the computer 38. Most preferably, the first communication device 62 is integrated into the computer 38 and comprises a cellular phone. A second communication device 64 is not connected to the computer 38 or the input device 22 and is located remote from the vehicle 36. The second communication device 64 is also preferably a cellular phone. The second communication device 64 is used by a remote user to communicate with the first communication device 62. The input device 22 also includes a battery 66. Most preferably the battery 66 is of a rechargeable type and the computer 38 is adopted to recharge the battery 66 when the first electrical connector 24 is received in the second electrical connector 28.

Most preferably the input device 22 is a personal data administrator commonly known as a palm held computer. Such an input device 22 would be removable from the docking site 26 and fully transportable by a user. Such an input device 22 would also include data typically found in such personal data administrators like address books, appointment calendars, and to do lists. Preferably, the computer 38 further includes functions implemented through software such as a vehicle security system, e-mail capability through the first communication device 62 and the modem 54, and voice recognition software for permitting audible input from the microphone 46 to control the functions of the computer 38. The vehicle components 60 which may be connected to the computer 38 would include such things as vehicle seats, side view and rear view mirrors, the vehicle audio system, the vehicle climate control system, and vehicle handling control components. Vehicle handling control components might include such things as shocks, all wheel drive systems, and vehicle transmission systems. These vehicle components 60 include a variety of settings which are be adjustable through the computer 38.

Figure 5:
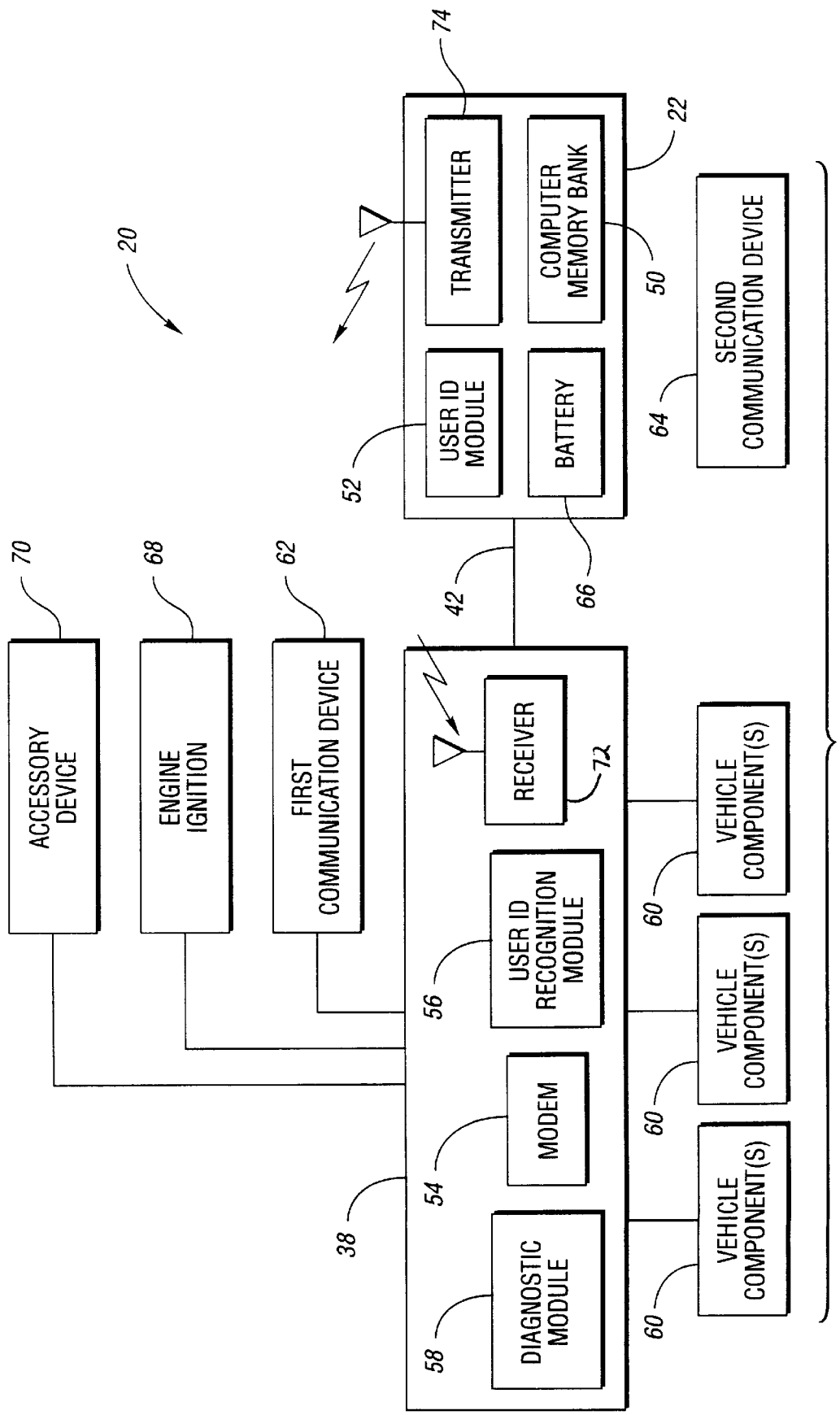
FIG. 5 is a schematic of a second embodiment of the interface designed according to this invention.

FIG. 5 is a schematic of a second embodiment of the interface 20 designed according to this invention. In this second embodiment, the computer 38 is in communication with an engine ignition system 68 and an electrical accessory device 70. The electrical accessory device 70 may be any type of electrical device in a vehicle which may be remotely controlled. A list of such electrical devices includes, but is not limited to, a door lock/unlock motor to remotely lock or unlock the doors of the vehicle, a trunk release solenoid to remotely open the trunk of the vehicle, a light relay to remotely switch on the interior and/or exterior lights of the vehicle, a horn relay to remotely sound the horn of the vehicle, a security relay to remotely enable or disable the security system of the vehicle, etc.

In this second embodiment, the computer 38 includes a receiver 72 for receiving or capturing wireless control signals. Accordingly, the input device 22 includes a transmitter circuit 74 for producing and transmitting such wireless control signals to the receiver 72 to operate the engine ignition system 68 and/or the electrical accessory device 70. In the alternative input device 22 designs, as illustrated in FIGS. 2 and 3, either a depression of a designated key on the keyboard 44 or a touch of the touch sensitive screen 48 initiates the transmission of wireless control signals from the transmitter circuit 74. The wireless control signals may be comprised from any known signal medium including, but not limited to, radio frequency, infrared, and ultrasonic waves. The operation of the control signals is of an ordinary design as will be understood by one having ordinary skill in the art.

In this manner, the input device 22 may be used to remotely control one or more electrical accessory devices 70 in a vehicle. Further, the input device 22 may also be used to remotely enable the engine ignition system 68. As such, a vehicle may be started without an ignition key yet still be protected against theft.

Alternatively, the interface 20 may be designed to enable the engine ignition system 68 through the communication cable 42 when the input device 22 is docked in the docking site 26. One way in which to securely enable the engine ignition system 68 is to exchange a security code signal through the communication cable 42 between the input device 22 and the computer 38 when the input device 22 is initially docked in the docking site 26. Upon the exchange of a valid security code signal, the computer 38 would enable the engine ignition system 68, thereby permitting the starting of the engine. Other ways to securely enable the engine ignition system 68 through the communication cable 42 will be understood by one having ordinary skill in the art. In this manner, a vehicle may also be started without an ignition key yet still be protected against theft.

Figure 6:
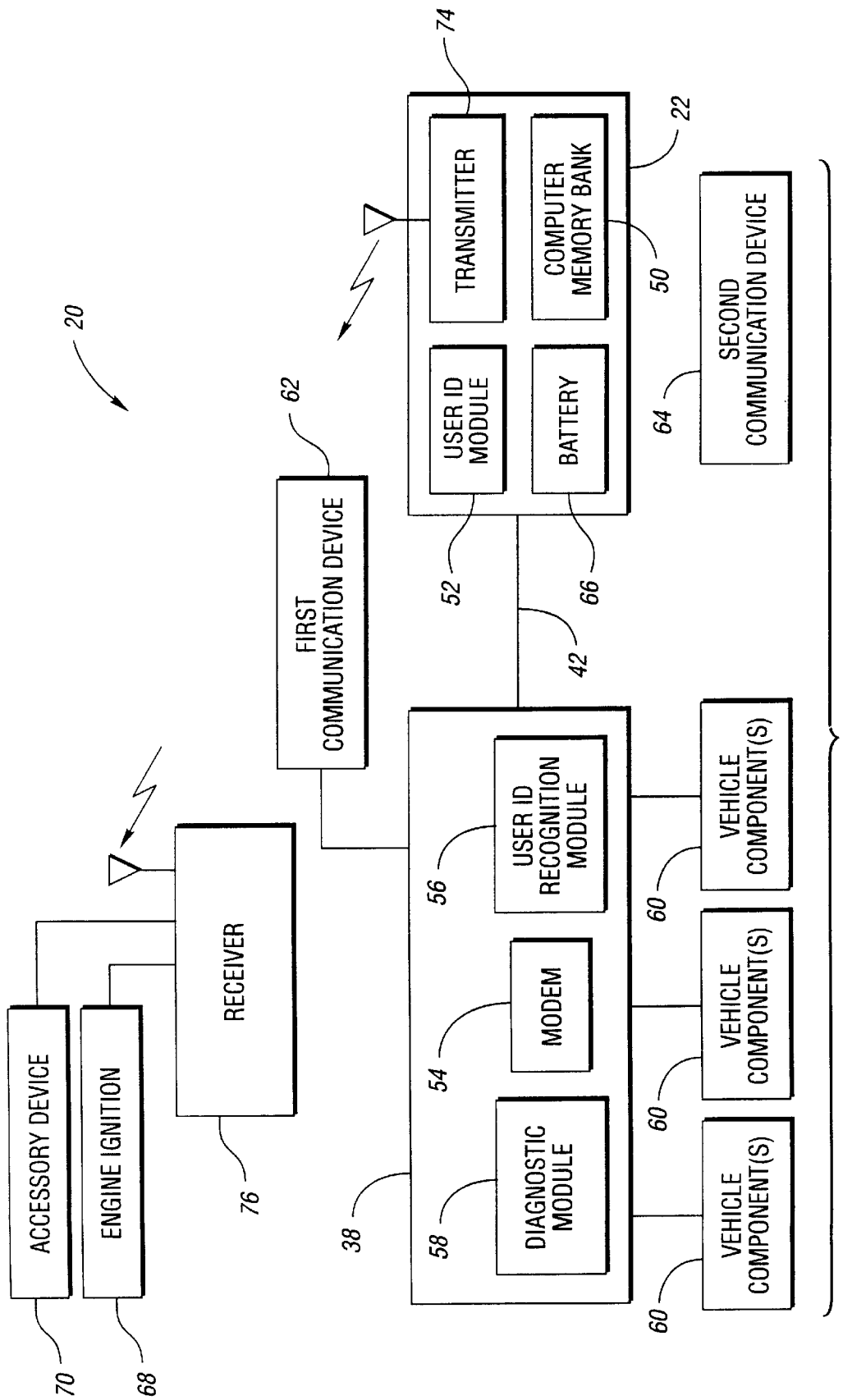
FIG. 6 is a schematic of a third embodiment of the interface designed according to this invention.

FIG. 6 is a schematic of a third embodiment of the interface 20 designed according to this invention. In this embodiment, the input device 22 includes the transmitter circuit 74 for producing and transmitting wireless control signals to operate the engine ignition system 68 and the electrical accessory device 70. The engine ignition system 68 and the electrical accessory device 70 are in communication with a receiver module 76 and not the computer 38. Unique to this third embodiment, the receiver module 76 operates independent of the computer 38. The receiver module 76 is of an ordinary design as will be understood by one having ordinary skill in the art. Accordingly, the receiver module 76 may be similar to a conventional remote keyless entry system receiver.

In this third embodiment, the receiver module 76 receives or captures wireless control signals transmitted from the input device 22 to operate the engine ignition system 68 and the electrical accessory device 70. In this manner, the input device 22 may be used to remotely control one or more electrical accessory devices 70 in a vehicle. Further, the input device 22 may also be used to remotely enable the engine ignition system 68. As such, a vehicle may be started without an ignition key yet still be protected against theft. This third embodiment is particularly adapted to quickly and inexpensively retrofit current model vehicles having a conventional remote keyless entry system.

Alternatively, the interface 20 may be designed such that the receiver module 76 controls the engine ignition system 68 and the electrical accessory device 70 indirectly through the computer 38. In this design, the receiver module 76 would receive or capture wireless control signals from the input device 22 and communicate such control signals to the computer 38. Accordingly, the computer 38 would then control the engine ignition system 68 and the electrical accessory device 70 in response to the control signals.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. An interface for communicating with a computer mounted in a vehicle, the interface comprising:

a personal data administrator adapted to be removed and transported by a user from the vehicle and having a first electrical connector;

a docking site having a second electrical connector adapted to receive said first electrical connector mounted in the vehicle for supporting said personal data administrator; and a communication cable connecting said second electrical connector to the computer thereby providing a communication path between said personal data administrator and the computer.

2. An interface as set forth in claim 1 wherein the computer is in communication with an electrical accessory device in the vehicle and includes a receiver for receiving wireless control signals and wherein said personal data administrator includes a transmitter circuit for producing and transmitting wireless control signals to the receiver in the computer to operate the electrical accessory device.

3. An interface as set forth in claim 2 wherein said personal data administrator includes at least one key for activating said transmitter circuit.

4. An interface as set forth in claim 2 wherein said personal data administrator includes a touch sensitive screen for activating said transmitter circuit.

5. An interface as set forth in claim 2 wherein said wireless control signals are radio frequency signals.

6. An interface as set forth in claim 2 wherein the electrical accessory device is a door lock/unlock motor.

7. An interface as set forth in claim 2 wherein the vehicle includes an engine ignition system and wherein said transmitter circuit produces and transmits wireless control signals to enable the engine ignition system.

8. An interface as set forth in claim 7 wherein the computer is in communication with a plurality of vehicle components and wherein said personal data administrator provides access through the computer to modify a plurality of settings of said plurality of vehicle components.

9. An interface a set forth in claim 8 wherein the computer includes a user identification recognition module and wherein said personal data administrator includes a user identification module;

said identification module accessible to said recognition module; and the computer modifying at least one of said plurality of settings of said plurality of vehicle components based on said identification module.

10. An interface as set forth in claim 1 wherein the computer is in communication with an engine ignition system for the vehicle and wherein said personal data administrator enables the engine ignition system through said communication cable when said personal data administrator is docked in said docking site.

11. An interface as set forth in claim 10 wherein a security code signal is exchanged through said communication cable between said personal data administrator and the computer when said personal data administrator is docked in said docking site and wherein the computer enables the engine ignition system upon exchange of a valid security code signal.

12. An interface as set forth in claim 10 wherein the vehicle includes an electrical accessory device and a receiver for receiving wireless control signals and wherein said personal data administrator includes a transmitter circuit for producing and transmitting wireless control signals to the receiver to operate the electrical accessory device.

13. An interface as set forth in claim 12 wherein the computer is in communication with a plurality of vehicle components and wherein said personal data administrator provides access through the computer to modify a plurality of settings of said plurality of vehicle components.

14. An interface as set forth in claim 13 wherein the computer includes a user identification recognition module and wherein said personal data administrator includes a user identification module;

said identification module accessible to said recognition module; and the computer modifying at least one of said plurality of settings of said plurality of vehicle components based on said identification module.

15. An interface for communicating with a computer mounted in a vehicle, the computer in communication with a security system and an ignition system and including a receiver, the interface comprising:

a personal data administrator adapted to be removed and transported by a user from the vehicle and having a transmitter circuit and a first electrical connector;

a docking site having a second electrical connector adapted to receive said first electrical connector mounted in the vehicle for supporting said personal data administrator;

a communication cable connecting said second electrical connector to the computer;

said personal data administrator controlling the security system with wireless communication between said transmitter circuit and the receiver in the computer; and said personal data administrator enabling the ignition system with communication through said communication cable when said personal data administrator is supported by said docking site.

16. An interface for communicating with a computer mounted in a vehicle, the interface comprising:

an input device adapted to be removed from the vehicle having a first electrical connector;

a docking site having a second electrical connector adapted to receive said first electrical connector mounted in the vehicle for supporting said input device; and a communication cable connecting said second electrical connector to the computer thereby providing a communication path between said input device and the computer wherein the computer is in communication with an electrical accessory device in the vehicle and includes a receiver for receiving wireless control signals and wherein said input device includes a transmitter circuit for producing and transmitting wireless control signals to the receiver in the computer to operate the electrical accessory device wherein the vehicle includes an engine ignition system and wherein said transmitter circuit produces and transmits wireless control signals to enable the engine ignition system.

17. An interface as set forth in claim 16 wherein the computer is in communication with a plurality of vehicle components and wherein said input device provides access through the computer to modify a plurality of settings of said plurality of vehicle components.

18. An interface as set forth in claim 17 wherein the computer includes a user identification recognition module and wherein said input device includes a user identification module;

said identification module accessible to said recognition module; and the computer modifying at least one of said plurality of settings of said plurality of vehicle components based on said identification module.

* * * * *